(12) United States Patent
Zhang et al.

(10) Patent No.: US 10,414,456 B2
(45) Date of Patent: Sep. 17, 2019

(54) TWO-WHEEL DYNAMIC BALANCE VEHICLE

(71) Applicant: NINEBOT (BEIJING) TECH CO., LTD., Beijing (CN)

(72) Inventors: Hui Zhang, Beijing (CN); Zhenyuan Zhang, Beijing (CN); Xudong Jiang, Beijing (CN); Lei Liu, Beijing (CN); Ye Wang, Beijing (CN); Zhongyuan Chen, Beijing (CN)

(73) Assignee: NINEBOT (BEIJING) TECH CO., LTD., Beijing (CN)

( * ) Notice: Subject to any disclaimer, the term of this patent is extended or adjusted under 35 U.S.C. 154(b) by 24 days.

(21) Appl. No.: 15/577,368

(22) PCT Filed: May 10, 2016

(86) PCT No.: PCT/CN2016/081579
§ 371 (c)(1),
(2) Date: Jan. 2, 2018

(87) PCT Pub. No.: WO2016/188320
PCT Pub. Date: Dec. 1, 2016

(65) Prior Publication Data
US 2018/0170476 A1 Jun. 21, 2018

(30) Foreign Application Priority Data

May 28, 2015 (CN) .......................... 2015 1 0280809

(51) Int. Cl.
*B62K 11/14* (2006.01)
*B62M 7/12* (2006.01)
(Continued)

(52) U.S. Cl.
CPC ............... *B62K 11/14* (2013.01); *B62J 99/00* (2013.01); *B62K 11/00* (2013.01); *B62K 11/007* (2016.11);
(Continued)

(58) Field of Classification Search
CPC ......... B62K 11/14; B62K 11/07; B62K 11/00; B62K 21/12; B62J 99/00; B62M 7/12
(Continued)

(56) References Cited

U.S. PATENT DOCUMENTS 7,783,392 B2 * 8/2010 Oikawa .................. A63C 17/08
180/218
8,322,478 B2 * 12/2012 Kim ..................... B62K 11/007
180/218
(Continued)

FOREIGN PATENT DOCUMENTS

CN          102795282 A      11/2012
CN          203381739 U       1/2014
(Continued)

OTHER PUBLICATIONS

International Search Report in international application No. PCT/CN2016/081579, dated Jul. 6, 2016, 3 pgs.
(Continued)

*Primary Examiner* — Jacob D Knutson
(74) *Attorney, Agent, or Firm* — Cooper Legal Group, LLC (57) ABSTRACT

A two-wheel dynamic balance vehicle comprises two wheels, a vehicle body, a middle cabin, a steering mechanism, and a control rod. The vehicle body is disposed on the two wheels. A pedal is disposed on the vehicle body. The middle cabin is disposed right above the pedal. The middle cabin comprises a housing. A display device is disposed on the housing, so as to make human-machine interaction (Continued)

information visible to an operator standing on the pedal. The steering mechanism comprises a steering shaft and a sensor. The control rod is connected to the steering shaft at the rear end of the vehicle body and extends from the rear end of the vehicle body to a position suitable for leg control of the operator. The control rod is rotated under the control of the operator, so as to drive the steering shaft to rotate to control steering of the vehicle body.

16 Claims, 5 Drawing Sheets

(51) Int. Cl.
    *B62K 11/00*     (2006.01)
    *B62J 99/00*     (2009.01)
    *B62K 21/12*     (2006.01)
    *B62J 17/08*     (2006.01)

(52) U.S. Cl.
    CPC .............. *B62K 21/12* (2013.01); *B62M 7/12* (2013.01); *B62J 2017/083* (2013.01); *B62J 2099/0026* (2013.01); *B62K 2204/00* (2013.01)

(58) Field of Classification Search
    USPC ........................................................ 180/6.6
    See application file for complete search history.

(56) References Cited

U.S. PATENT DOCUMENTS

| | | | | |
|---|---|---|---|---|
| 2007/0251735 | A1* | 11/2007 | Kakinuma | ............ A63C 17/08 180/6.5 |
| 2010/0250040 | A1* | 9/2010 | Yamano | ............... B62K 11/007 701/22 |
| 2016/0176469 | A1 | 6/2016 | Zhang et al. | |
| 2016/0185412 | A1* | 6/2016 | Zuo | ............................ B60L 3/12 180/218 |
| 2017/0253287 | A1* | 9/2017 | Zuo | ........................ H02K 33/00 |

FOREIGN PATENT DOCUMENTS

| | | | | |
|---|---|---|---|---|
| CN | 203381739 U | * | 1/2014 | ........... B62K 11/007 |
| CN | 103552635 A | | 2/2014 | |
| CN | 103552646 A | | 2/2014 | |
| CN | 103754301 A | | 4/2014 | |
| CN | 203593123 U | | 5/2014 | |
| CN | 103754301 A | | 6/2014 | |
| CN | 203780695 U | * | 8/2014 | |
| CN | 203780695 U | | 8/2014 | |
| CN | 203793524 U | | 8/2014 | |
| CN | 204077970 U | | 1/2015 | |
| CN | 204236697 U | | 4/2015 | |
| CN | 104627288 A | | 5/2015 | |
| CN | 104843117 A | | 8/2015 | |
| CN | 204821903 U | * | 12/2015 | |
| CN | 106240714 A | * | 12/2016 | |
| EP | 2213564 A1 | | 8/2010 | |
| JP | 2005335471 A | | 12/2005 | |
| JP | 200745330 A | | 2/2007 | |
| JP | 200859497 A | | 3/2008 | |
| JP | 2009120176 A | | 6/2009 | |
| JP | 201179426 A | | 4/2011 | |
| JP | 2012126224 A | | 7/2012 | |
| JP | 201415122 A | | 1/2014 | |

OTHER PUBLICATIONS

English Translation of the Written Opinion of the International Search Authority in international application No. PCT/CN2016/081579, dated Jul. 6, 2016, 7 pgs.

Supplementary European Search Report in European application No. 16799209.8, dated May 25, 2018, 8 pgs.

* cited by examiner

TWO-WHEEL DYNAMIC BALANCE VEHICLE

TECHNICAL FIELD

The disclosure relates to the technical field of transportation vehicles, and particularly to a leg-controlled two-wheeled dynamic balance vehicle that enables an operator to watch a display screen during driving.

BACKGROUND

At present, electricity-driven transportation vehicles, particularly two-wheeled dynamic balance vehicles capable of realizing a short-distance transportation function, become a main transportation tool in daily lives of people. Two-wheeled dynamic balance wheels mainly include vehicle of hand-operated type and vehicle of leg-operated type. A common point of the vehicles of these types lies in that steering of a vehicle body is achieved through control a rod provided at front end of the vehicle body of the balance vehicle.

For a hand-operated two-wheeled dynamic balance vehicle, a control rod is relatively long, and a display screen for displaying battery level, driving state information of a vehicle body and the like is provided on the control rod for an operator to use as a reference. While for a leg-operated two-wheeled dynamic balance vehicle, a control rod is relatively short, and a display screen is difficult to be mounted on the control rod, and if no display screen is mounted, it is difficult for an operator to know information of a vehicle body in real time.

In addition, as an increasing demand for two-wheeled dynamic balance vehicles having lighter weight and smaller size, size of the two-wheeled dynamic balance vehicles become smaller and smaller. Thus, it is more difficult to mount a display screen on a leg-controlled two-wheeled dynamic balance vehicle.

Therefore, a two-wheeled dynamic balance vehicle which enables an operator to watch information about the battery level, the driving state and the like is expected.

SUMMARY

In order to solve the problem in the prior art, embodiments of the disclosure provide a two-wheeled dynamic balance vehicle with a display screen mounted on a middle cabin, to enable an operator to know the battery level, the driving state and the like of a vehicle body through the display screen.

The technical solutions adopted by the embodiments of the disclosure are implemented as follows.

In an embodiment of the disclosure, a two-wheeled dynamic balance vehicle is provided, which may include: two wheels; a vehicle body, provided on the two wheels, a pedal being provided on the vehicle body; a middle cabin, provided directly above the pedal, the middle cabin including a housing, a display device being provided on the housing to enable an operator standing on the pedal to read man-machine interaction information; a steering mechanism, accommodated in the housing and including a steering shaft and a sensor; and a control rod, the control rod being connected with the steering shaft at a rear end of the vehicle body and extending from the rear end of the vehicle body to a position suitable for leg-control of the operator, the control rod being rotated under control of the operator, thereby driving the steering shaft in rotation, so as to control steering of the vehicle body.

In one embodiment, the housing may be formed with an upper slope surface extending from the rear end of the vehicle body and a lower slope surface connected with the upper slope surface, the control rod may be formed with a bending portion matched with a shape of the upper slope surface.

In one embodiment, the display device may be provided on the upper slope surface and/or the lower slope surface.

In one embodiment, the housing may be formed with a transparent region, and the display device may be located within the housing and may correspond to a position of the transparent region.

In one embodiment, a clamping element suitable for being clamped by legs of the operator may be connected to the control rod.

In one embodiment, external of the clamping element may be wrapped with a flexible part.

In one embodiment, the control rod may be connected with the steering shaft through a connecting seat, the connecting seat may include a connecting sleeve and a connecting rod, the connecting sleeve may be connected with the steering shaft, the connecting rod may be connected with the control rod.

In one embodiment, the display device may be a Light Emitting Diode (LED) display screen or a Liquid Crystal Display (LCD) screen.

In one embodiment, a handle portion may be provided on the housing.

In another embodiment of the disclosure, a combined mechanism of a middle cabin and a control rod is further provided, which may be mounted on a vehicle body of a two-wheeled dynamic balance vehicle and include the middle cabin and the control rod, the middle cabin may be provided directly above the vehicle body, the middle cabin may be provided with a housing, a display device may be provided on the housing to enable an operator standing on the vehicle body to read man-machine interaction information, the housing may be formed with an accommodation space, a steering mechanism for controlling steering of the vehicle body may be accommodated in the accommodation space, the steering mechanism may include a steering shaft and a sensor; the control rod may be connected with the steering shaft at a rear end of the vehicle body, and may extend from the rear end of the vehicle body to a position suitable for leg control of the operator, and the control rod may be rotated under control of the operator, thereby driving the steering shaft in rotation, so as to control steering of the vehicle body.

The technical solutions provided by the embodiments of the disclosure have the following beneficial effects: the display device is formed on the middle cabin provided at a middle position of the vehicle body of the two-wheeled vehicle, so that the operator may read the man-machine interaction information displayed by the display device no matter whether standing on the vehicle body or not, and this is favorable for the operator to know related state information of the vehicle body in real time; the control rod for achieving steering is fixed at the rear end of the vehicle body, and the control rod is provided with the bending portion matched with a shape of the middle cabin close to it, so that an external space may be saved as much as possible, and the whole dynamic balance vehicle seems more compact; moreover, a bending position of the bending portion is substantially on a straight line perpendicular to a midpoint of a length of the middle cabin on the vehicle body, then the operator may clamp the clamping element provided on the control rod by two legs and swing the two legs to drive the control rod, to rotate the control rod leftwards and rightwards to drive the steering shaft to steer, thereby driving the vehicle body to be steered and achieving the steering of the vehicle body.

The above description is only a summary about the technical solutions of the disclosure, and may be implemented according to the contents of the specification to understand the technical means of the disclosure more clearly. Moreover, for making the abovementioned and other purposes, characteristics and advantages of the disclosure more obvious and easier to understood, specific embodiments of the disclosure will be listed below.

BRIEF DESCRIPTION OF DRAWINGS

Various advantages and benefits are clearer to those skilled in the art by reading following detailed descriptions of preferred embodiments. The drawings of the embodiments are only adopted to show the purposes of the preferred embodiments and not considered as limits to the disclosure. Moreover, in the whole drawings, the same reference symbols are adopted to represent the same parts. In the drawings.

DETAILED DESCRIPTION

Exemplary embodiments of the disclosure will be described in more detail with reference to the drawings. Although the exemplary embodiments of the disclosure are shown in the drawings, it should be understood that the disclosure may be implemented in various ways and should not be limited to the embodiments recited herein. Instead, these embodiments are provided to make the disclosure be understood more thoroughly, and to completely deliver the scope of the disclosure to those skilled in the art.

In the drawings, concepts "upper", "lower", "left" and "right" represent "upward", "downward", "leftward" and "rightward" directions viewed from the drawings.

An embodiment of the disclosure provides a two-wheeled dynamic balance vehicle including: two wheels, a vehicle body which is provided on the two wheels and is provided with a pedal, a middle cabin which is provided over the pedal and includes a housing provided with a display device for enabling an operator standing on the pedal to read man-machine interaction information, a steering mechanism accommodated in the housing and including a steering shaft and a sensor, and a control rod which is connected with the steering shaft at a rear end of the vehicle body and extends from the rear end of the vehicle body to a position suitable for leg-control of the operator, and which is rotated under the control of the operator to cause the rotation of the steering shaft and control steering of the vehicle body. The two-wheeled dynamic balance vehicle provided by the embodiment of the disclosure is a two-wheeled dynamic balance vehicle whose steering is achieved by operation of legs, and is structurally similar to an existing two-wheeled dynamic balance vehicle in the field of two-wheeled dynamic balance vehicles, except structures of the middle cabin and the control rod. Therefore, in the embodiment of the disclosure, only the middle cabin and the control rod are specifically described, the other two-wheeled dynamic balance vehicle structures not described herein belong to characteristics which can be obtained from the prior art by those skilled in the art, and will not be described in detail. The middle cabin and control rod of the embodiment of the disclosure will be described below in combination with FIGS. 1 to 13.

Figure 1:
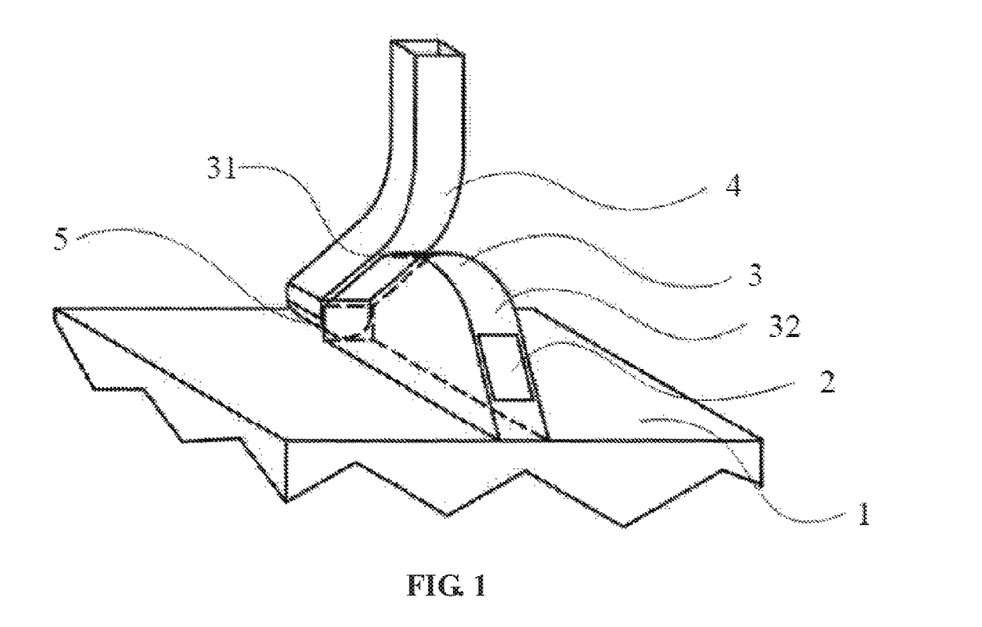
FIG. 1 is a structure diagram of two-wheeled dynamic balance vehicle according to a first embodiment of the disclosure.

FIG. 1 is a structure diagram of a two-wheeled dynamic balance vehicle according to a first embodiment of the disclosure. In this figure, only a vehicle body 1 (only an upper part of the vehicle body is shown), middle cabin 3, control rod 4, steering shaft 5 of a steering mechanism and the like of the two-wheeled dynamic balance vehicle are shown, a display device 2 is provided on the middle cabin 3, the steering shaft 5 is accommodated in the middle cabin 3, and the control rod 4 is connected with the steering shaft 5 from a rear end of the vehicle body and is adapted to shape of a middle cabin part close to it.

In an embodiment, as shown in FIG. 1, the middle cabin 3 is fixedly arranged at a middle position directly above the vehicle body 1, and is located between pedal pads on the vehicle body 1 used for placing two feet of an operator, a connecting part between the middle cabin 3 and a plane where the pedal is located on the plane where the pedal is located, i.e. a lower end of the middle cabin 3 is fixed on the plane where the pedal is located. The middle cabin 3 may include a housing formed with an accommodation space for accommodating the steering mechanism and the like. The display device 2 is provided on the middle cabin 3, the display device 2 is configured to display man-machine interaction information, and a mounting position of the display device 2 is a position enabling the operator standing on the pedal to conveniently read the man-machine interaction information. In addition, besides the display device 2, a buzzer, a Bluetooth module, a power button and the like are further provided on the housing of the middle cabin 3. These structures are well-known structures in the field, and detailed introductions about them are eliminated herein.

The specific arrangement position of the display device 2 is not specifically limited in the embodiment of the disclosure as long as the man-machine interaction information displayed by the display device 2 are visible when the operator standing on the pedal of the vehicle body 1 look down. The man-machine interaction information displayed by the display device 2 includes battery level information of a battery in the vehicle body 1 and driving state information of the vehicle body, and may further include light intensity information and the like. A light intensity refers to the sensed external light intensity information. When external light is relatively intense (for example, in the daytime), a signal indicating a high light intensity can be displayed on the display device 2, and at this moment, a master control board may reduce a luminous intensity of the display device. When the external light is relatively weak (for example, in the evening), a signal indicating a low light intensity can be displayed on the display device 2, and at this moment, the master control board may increase the luminous intensity of the display device 2. In such a manner, power may be saved, and service life of the battery may be prolonged. The display device 2 may be a light emitting diode (LED) display screen or a liquid crystal display (LCD) screen, and may also be another display device capable of realizing a display function. In order to accomplish the mounting of the display device 2, a transparent region suitable for displaying the man-machine interaction information displayed by the display device 2 is provided on the housing of the middle cabin 3. The transparent region may be a semitransparent region, and the display device 2 may be snugly mounted in the semitransparent region from an interior of the housing to accomplish the mounting of the display device 2.

In the embodiment, the middle cabin 3 may be a triangle-like or peak-like structure, i.e. a shape high in middle and low in two sides. The housing of the middle cabin may include a left housing, a middle housing and a right housing. The middle housing is clamped between the left housing and the right housing, and forms the accommodation space together with the left and right housings. Sections of the left and right housings may be triangle-like shapes, and the middle housing may be an arched shape. In the embodiment, the display device 2 is provided on the middle housing, then at least a part of the middle housing is formed with the semitransparent region for arranging the display device 2. The semitransparent region may be formed from a semi-transparent resin, and may also be formed from another material. The display device 2 may be engaged on the middle housing through engaging grooves formed in the left and right housings. In this way, the man-machine interaction information displayed by the display device 2 may be displayed through the semitransparent region on one hand, and on the other hand, the display device 2 may be protected from being damaged by an external impact, by the semi-transparent region covering it.

Figure 3:
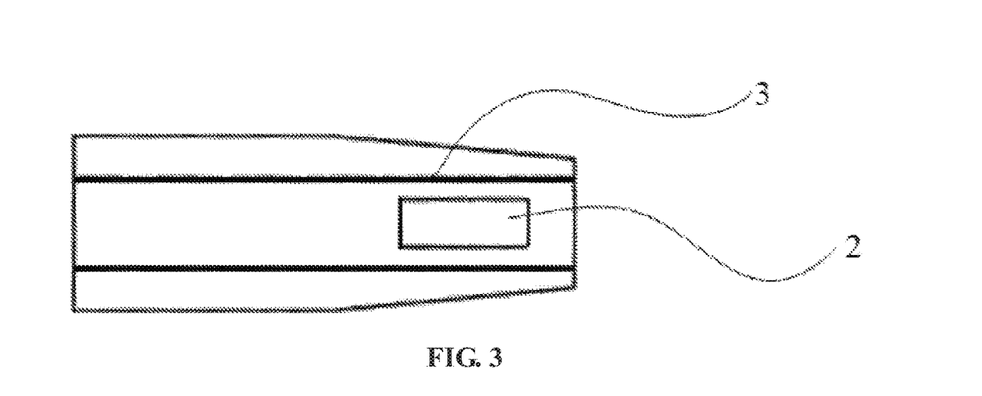
FIG. 3 and FIG. 4 are a top view and side view of a middle cabin shown in FIG. 1 and FIG. 2 respectively.
Figure 4:
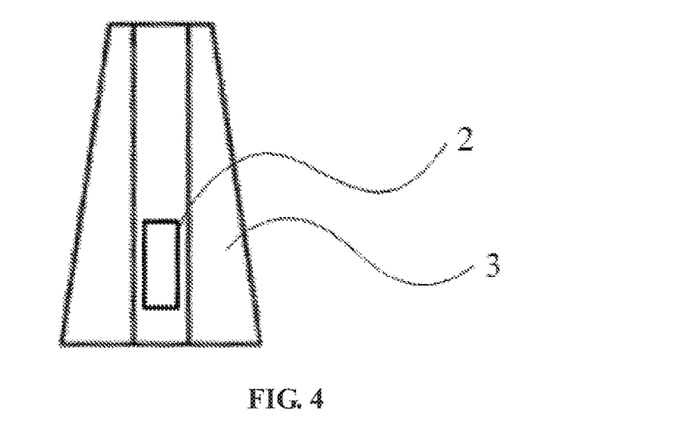

As shown in FIG. 1, in an example of the embodiment, the middle housing may include an upper slope surface 31 and a lower slope surface 32. The upper slope surface 31 is located at the rear end of the vehicle body 1, and is a surface bending upwards and extending from the rear end of the vehicle body 1 to a front end of the vehicle body 1. The lower slope surface 32 is connected with the upper slope surface 31, and is a surface bending downwards and extending from a connection part of the upper slope surface 31 to the front end of the vehicle body 1. The display device 3 is provided on the lower slope surface 32, and in this case, schematic diagrams shown in FIG. 3 and FIG. 4 can be seen when the middle cable 3 is viewed from above and front of the vehicle body (FIG. 3 and FIG. 4 only represent schematic diagrams viewed from above and front of the vehicle body, and sizes shown in FIG. 3 and FIG. 4 are different from that in FIG. 1). That is, the operator may read the man-machine interaction information displayed by the display device 2 when standing on the pedal of the vehicle body 1 and looking down, and also may read the man-machine interaction information displayed by the display device 2 when standing in front of the vehicle body 1. That is to say, the operator may read the man-machine interaction information displayed by the display device 2 no matter whether standing on the vehicle body or not. Of course, the display device 2 may also be provided in a region of the whole lower slope surface 32, which extends from the lower slope surface 32 to a part of the upper slope surface 31.

In another example of the embodiment, the middle housing may include an upper slope surface, a flat surface and a lower slope surface, that is, the upper slope surface is connected with the lower slope surface through the flat surface, and the display device 2 may be provided on both the flat surface and the lower slope surface. However, the display device 2 may also be provided only on the lower slope surface, and in this case, the lower slope surface may be configured in such a way that the operator may read the man-machine interaction information displayed by the display device 2 no matter whether standing on the vehicle body or not. The display device may also be provided only on the flat surface to enable the operator to read the man-machine interaction information when standing on the pedal.

Figure 10:
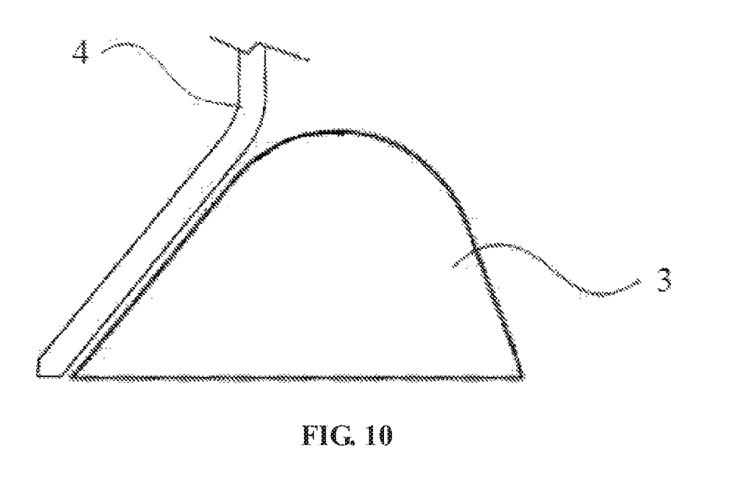
FIG. 10 and FIG. 11 are structure diagrams showing the cooperation of a control rod and middle cabin according to an embodiment of the disclosure.
Figure 11:
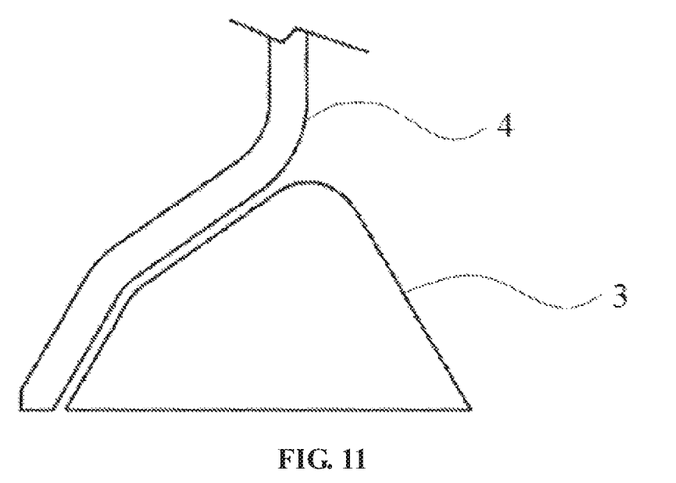

In addition, the middle cabin 3 may have various different forms as long as it is suitable for placing the display device 2 to enable the operator to read the man-machine interaction information when standing on the pedal. FIG. 10 and FIG. 11 show two forms of the middle cabin 3, and show forms of the control rod 4 adapted to the middle cabin 3.

The steering mechanism is accommodated in the accommodation space formed by the housing, and may include the steering shaft 5 and a sensor (not shown). The steering shaft 5 is connected with the control rod 4 to control the steering of the vehicle body 1. In a driving process of the two-wheeled dynamic balance vehicle, the operator controls the control rod 4 through legs to rotate the steering shaft 5 along with a rotation of the control rod 4. The sensor may sense a steering action of the steering shaft 5 and generate a corresponding steering signal for sending to the master control board (not shown) provided on the vehicle body. The master control board may generate a corresponding control signal based on the received steering signal, to control output of a motor corresponding to the wheels to be steered, thereby achieving the steering of the vehicle body. The sensor may include a Hall sensor and two rotor magnets which are driven in rotation by the control rod 4, thereby changing a magnetic field applied to the Hall sensor, and thus the Hall sensor outputs a corresponding electric signal.

Figure 9:
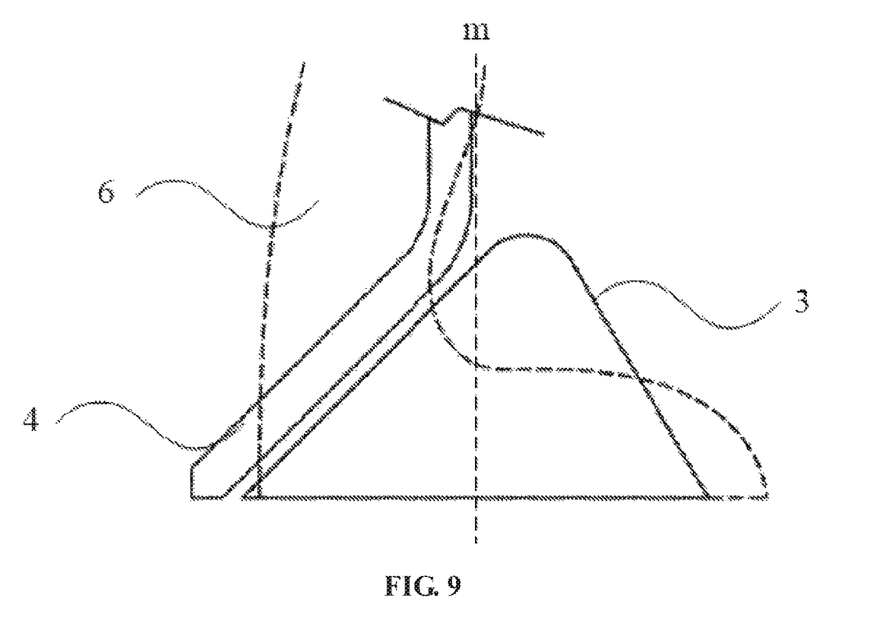
FIG. 9 is a schematic diagram shows that feet of an operator are located on a pedal of a two-wheeled dynamic balance vehicle of an embodiment of the disclosure.

As shown in FIG. 1, the control rod 4 is connected with the steering shaft 5 at the rear end of the vehicle body 1, and extends from the rear end of the vehicle body to a position suitable for leg-control of the operator. That is to say, in this embodiment, the control rod 4 is "rear-mounted", which is different from a structure in the prior art where the control rod is provided at the front end of the vehicle body. By such a "rear-mounted" control rod, the operator may read the man-machine interaction information displayed by the display device provided on the housing when driving the two-wheeled dynamic balance vehicle. Moreover, a space of the vehicle body may be effectively utilized, and a used space is enlarged as much as possible without influence on operation and attractive appearance, so as to minimize the size of the vehicle body. The control rod 4 may be connected with the steering shaft 5 through a steering seat (not shown), and may also be directly connected with the steering shaft 5. When the steering seat is adopted for achieving the connection with the steering shaft, the steering seat may include a connecting sleeve and a connecting rod. The connecting sleeve may be connected with the steering shaft through a screw. One end of the connecting rod is fixedly connected with the connecting sleeve, and the other end is connected with the control rod 4. A clamping element (not shown) suitable for being clamped by the legs is connected to the control rod 4. For facilitating clamping, external of the clamping element may be wrapped with a flexible part suitable for being clamped by the legs of the operator. In order to save an external space as much as possible, make the whole two-wheeled dynamic balance vehicle more compact and avoid troubles to a body of the operator driving the two-wheeled dynamic balance vehicle, the control rod 4 may extend at its lower end in a manner of following a shape of the housing of the middle cabin, namely to form a bending portion matched with the shape of the housing. "Matched" in the embodiment of the disclosure refers to substantial consistency, and does not mean complete identical or consistency. As shown in FIG. 9, an extending position of the bending portion is substantially on a front-rear midline m of the middle cabin 3, and the front-rear midline of the middle cabin 3 refers to a straight line perpendicular to the surface of the vehicle body 1, an intersection point of the straight line and the surface of the vehicle body 1 being a midpoint of a length of the middle cabin 3 on the vehicle body 1. In other words, a perpendicular plane on the control rod where a perpendicular portion connected with the bending portion is located, is a perpendicular plane suitable for the operator to clamp the flexible part to operate the two-wheeled dynamic balance vehicle. That is to say, the control rod 4 is provided to be suitable for the operator to clamp the flexible part. When the operator stands on the vehicle body 1 by the feet 6, the operator may clamp the flexible part connected with the perpendicular portion by the two legs and swing the two legs to drive the control rod 4 and rotate it leftwards and rightwards, to drive the steering shaft 5 to steer and further drive the vehicle body to be steered to achieve the steering.

In the embodiment, since the middle cabin 3 is mounted on the plane where the pedal is located, in such a mounting structure, the part of the control rod 4 connected with the steering shaft 5 is "exposed" from the above of the vehicle body 1.

Figure 2:
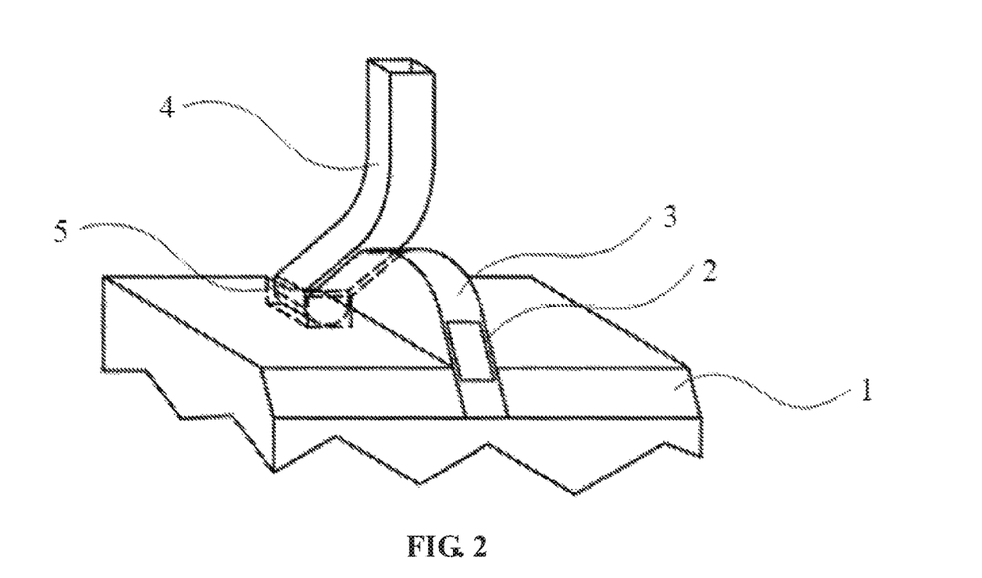
FIG. 2 is a structure diagram of a two-wheeled dynamic balance vehicle according to a second embodiment of the disclosure.

FIG. 2 is a structure diagram of a two-wheeled dynamic balance vehicle according to a second embodiment of the disclosure. In this figure, only a vehicle body 1 (only an upper part of the vehicle body is shown), middle cabin 3, control rod 4, steering shaft 5 of a steering mechanism and the like of the two-wheeled dynamic balance vehicle are shown. A display device 2 is provided on the middle cabin 3, the steering shaft 5 is accommodated in the middle cabin 3, and the control rod 4 is connected with the steering shaft 5 from a rear end of the vehicle body and is adapted to shape of a middle cabin part close to it.

The structure of the two-wheeled dynamic balance vehicle in the embodiment is substantially the same as the first embodiment, and a difference lie in that the middle cabin 3 in the embodiment is not provided on a plane where a pedal is located, and its lower end is "sunken" into the vehicle body (a groove is formed in the vehicle body 1, and the lower end of the middle cabin 3 is mounted in the groove and fixed on the vehicle body). In such a mounting structure, a part of the control rod 4 connected with the steering shaft 5 is "sunken" into the vehicle body 1.

Figure 5:
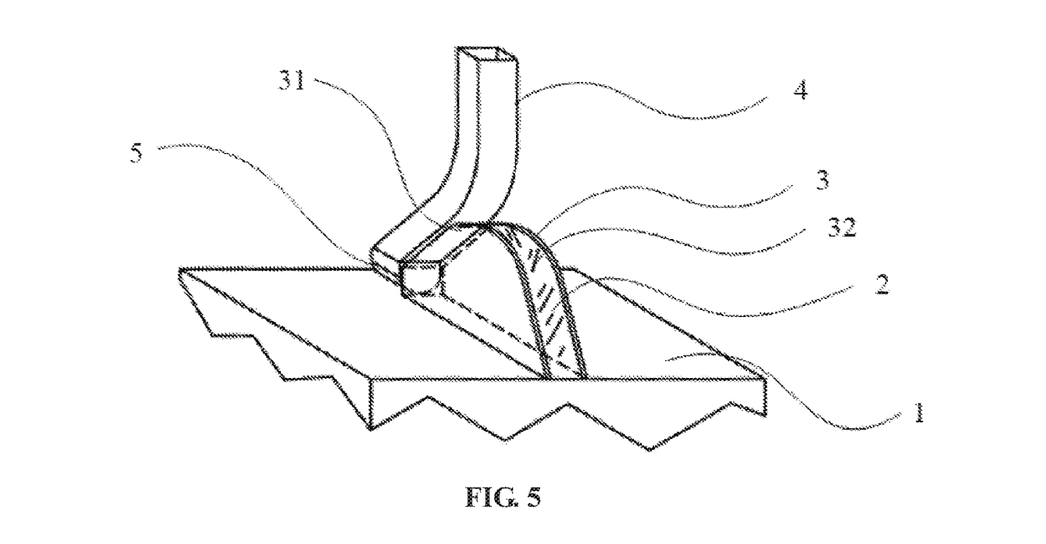
FIG. 5 is a structure diagram of a two-wheeled dynamic balance vehicle according to a third embodiment of the disclosure.

FIG. 5 is a structure diagram of a two-wheeled dynamic balance vehicle according to a third embodiment of the disclosure. In this figure, only a vehicle body 1 (only an upper part of the vehicle body is shown), middle cabin 3, control rod 4, steering shaft 5 of a steering mechanism and the like of the two-wheeled dynamic balance vehicle are shown. A display device 2 is provided on the middle cabin 3, the steering shaft 5 is accommodated in the middle cabin 3, and the control rod 4 is connected with the steering shaft 5 from a rear end of the vehicle body and is adapted to a shape of a middle cabin part close to it.

Figure 7:
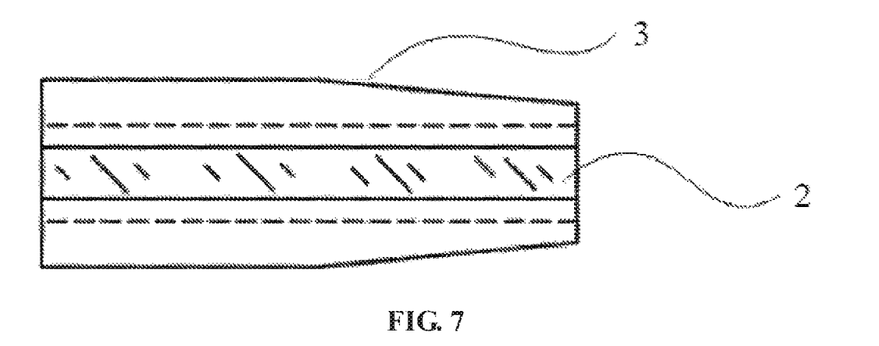
FIG. 7 and FIG. 8 are a top view and side view of a middle cabin shown in FIG. 5 and FIG. 6 respectively.
Figure 8:
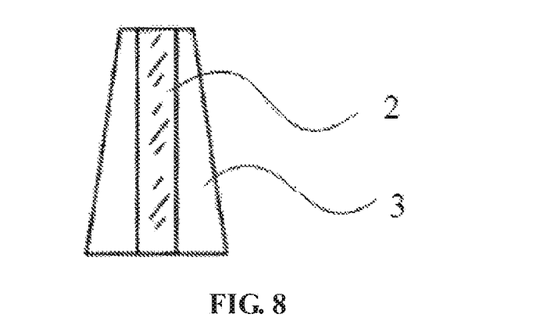

The structure of the two-wheeled dynamic balance vehicle in the embodiment is substantially the same as the first embodiment, and a difference lie in that the display device 2 is provided at the whole middle part of the middle cabin 3, i.e. a middle housing. When the middle cabin 3 of the embodiment is viewed from the above and front of the vehicle body 1, observed diagrams can be as shown in FIGS. 7 and 8 (FIG. 7 and FIG. 8 only represent the diagrams viewed from the above and front of the vehicle body, and sizes shown in these figures are different from that in FIG. 5). The display device 2 provided at the whole middle part of the middle cabin 3, not only ensures that man-machine interaction information displayed by the display device are visible from several angles, but also improves attractive appearance of the vehicle body.

Figure 6:
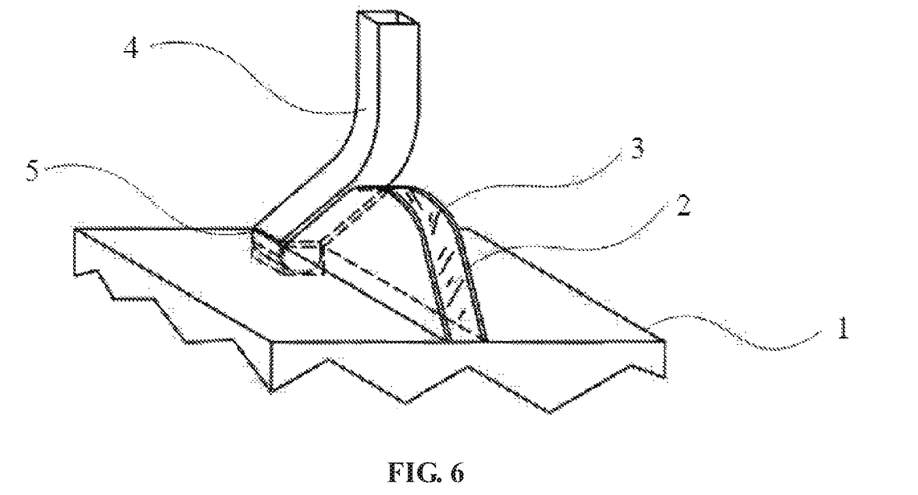
FIG. 6 is a structure diagram of a two-wheeled dynamic balance vehicle according to a fourth embodiment of the disclosure.

FIG. 6 is a structure diagram of a two-wheeled dynamic balance vehicle according to a fourth embodiment of the disclosure. In the diagram, only a vehicle body 1 (only an upper part of the vehicle body is shown), middle cabin 3, control rod 4, steering shaft 5 of a steering mechanism and the like of the two-wheeled dynamic balance vehicle are shown. A display device 2 is provided on the middle cabin 3, the steering shaft 5 is accommodated in the middle cabin 3, and the control rod 4 is connected with the steering shaft 5 from a rear end of the vehicle body and is adapted to a shape of a middle cabin part close to it.

The structure of the two-wheeled dynamic balance vehicle in the embodiment is substantially the same as the third embodiment, and a difference lie in that the middle cabin 3 in the embodiment is not provided on a plane where a pedal is located, and its lower end is "sunken" into the vehicle body (a groove is formed in the vehicle body 1, and the lower end of the middle cabin 3 is mounted in the groove and fixed on the vehicle body). In such a mounting structure, a part of the control rod 4 connected with the steering shaft 5 is "sunken" into the vehicle body 1.

Figure 12:
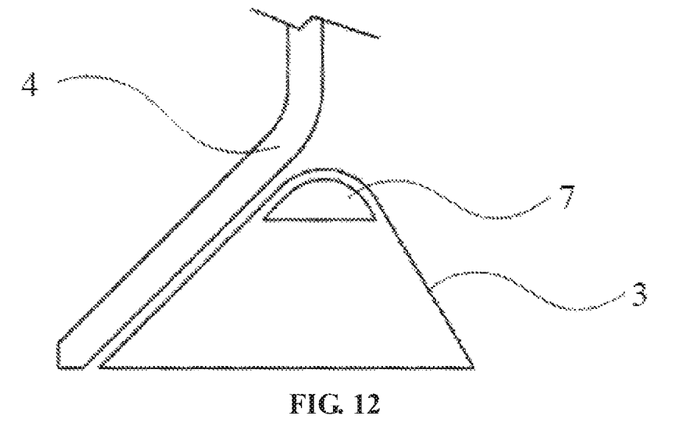
FIG. 12 and FIG. 13 are structure diagrams of a middle cabin with a handle portion according to an embodiment of the disclosure.
Figure 13:
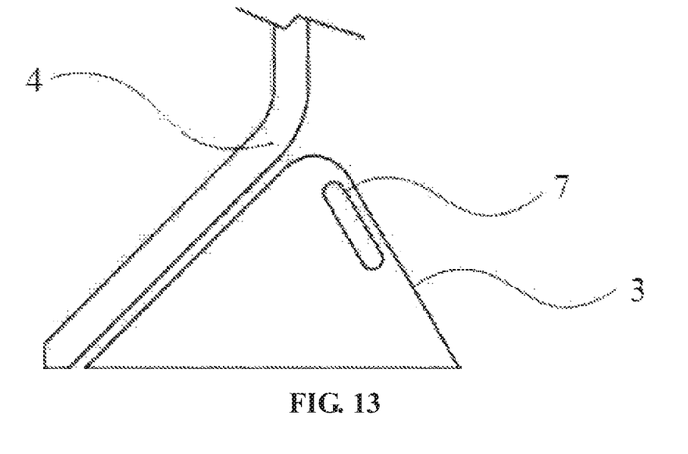

In the embodiment of the disclosure, in order to facilitate mounting and dismounting of the middle cabin 3 on the vehicle body 1, a handle portion 7 may be provided on the housing of the middle cabin in the embodiment, and the handle portion 7 may be implemented in form of forming an opening in the housing, as shown in FIGS. 12 and 13. The handle portion 7 shown in FIG. 12 is provided at a top of the middle cabin 3, and is formed by transversely forming an opening in an upper part of the housing. The handle portion 7 shown in FIG. 13 is provided at a side part of the middle cabin 3, and is formed by obliquely forming an opening in a side part of the housing. Of course, the handle portion 7 may also be provided at another position of the housing of the middle cabin 3, and a shape of the handle portion 7 may also be another structure suitable to handle.

It should be noted that, in other embodiments not shown in the disclosure, the housing of the middle cabin 3 may also have another structure, and is not limited to the triangle or peak-like structure of the left and right housings and the middle housing, and may adopt any structure suitable for arranging the display device 2 and enabling the operator to read the man-machine interaction information displayed by the display device 2 when standing on the vehicle body 1. For example, the housing may be an integrated structure formed with a semitransparent region for arranging the display device 2 at a front part of the structure.

An embodiment of the disclosure further provides a combined mechanism of a middle cabin and a control rod, which is mounted on a vehicle body of a two-wheeled dynamic balance vehicle and includes the middle cabin and the control rod, the middle cabin is provided directly above the vehicle body. The middle cabin is provided with a housing on which a display device is provided, to enable an operator standing on the vehicle body to read man-machine interaction information. The housing is formed with an accommodation space in which a steering mechanism for controlling steering of the vehicle body is accommodated. The steering mechanism includes a steering shaft and a sensor, the control rod is connected with the steering shaft at a rear end of the vehicle body and extends from the rear end of the vehicle body to a position suitable for leg-control of the operator. The control rod is rotated under control of the operator, thereby driving the steering shaft in rotation to control steering of the vehicle body. Structures of the middle cabin, control rod and steering mechanism in the combined mechanism, connecting relationships therebetween and the like are the same as those described in the abovementioned embodiments. For avoiding repetitions, specific descriptions about them are eliminated herein.

The above description shows and describes a plurality of preferred embodiments of the disclosure. However, as mentioned above, it should be understood that the disclosure is not limited to forms disclosed by the specification, and should not be considered to exclude other embodiments, the disclosure may be applied to various other combinations, modifications and environments and may be modified within the scope of the inventive concept of the specification through the above guidance or technologies or knowledge of related arts. All modifications and variations made by those skilled in the art without departing from the spirit and scope of the disclosure shall fall within the scope of protection of the appended claims of the disclosure.

The invention claimed is:

1. A two-wheeled dynamic balance vehicle, comprising:
   two wheels;
   a vehicle body, provided on the two wheels, a pedal being provided on the vehicle body;
   a middle cabin, provided directly above the pedal, the middle cabin comprising a housing, a display device being provided on the housing to enable an operator standing on the pedal to read man-machine interaction information, wherein the housing is formed with an upper slope surface located at a rear end of the vehicle body and a lower slope surface connected with the upper slope surface, the upper slope surface being a surface bending upwards and extending from the rear end of the vehicle body towards a front end of the vehicle body, the lower slope surface being a surface bending downwards and extending from the upper slope surface towards the front end of the vehicle body, the display device being provided on the lower slope surface;
   a steering mechanism, accommodated in the housing and comprising a steering shaft and a sensor; and
   a control rod, the control rod being connected with the steering shaft at the rear end of the vehicle body and extending from the rear end of the vehicle body to a position suitable for leg-control of the operator, the control rod being formed with a bending portion matched with a shape of the upper slope surface, the control rod being rotated under control of the operator, thereby driving the steering shaft in rotation, so as to control steering of the vehicle body.

2. The two-wheeled dynamic balance vehicle according to claim 1, wherein the housing is formed with a transparent region, the display device is located within the housing and corresponds to a position of the transparent region.

3. The two-wheeled dynamic balance vehicle according to claim 1, wherein a clamping element suitable for being clamped by legs of the operator is connected to the control rod.

4. The two-wheeled dynamic balance vehicle according to claim 3, wherein external of the clamping element is wrapped with a flexible part.

5. The two-wheeled dynamic balance vehicle according to claim 1, wherein the control rod is connected with the steering shaft through a connecting seat, the connecting seat comprises a connecting sleeve and a connecting rod, the connecting sleeve is connected with the steering shaft, the connecting rod is connected with the control rod.

6. The two-wheeled dynamic balance vehicle according to claim 1, wherein the display device is a Light Emitting Diode display screen or a Liquid Crystal display screen.

7. The two-wheeled dynamic balance vehicle according to claim 1, wherein a handle portion is provided on the housing.

8. A combined mechanism of a middle cabin and a control rod, mounted on a vehicle body of a two-wheeled dynamic balance vehicle and comprising the middle cabin and the control rod, wherein the middle cabin is provided directly above the vehicle body, the middle cabin being provided with a housing, a display device is being provided on the housing to enable an operator standing on the vehicle body to read man-machine interaction information, wherein the housing is formed with an upper slope surface located at a rear end of the vehicle body and a lower slope surface connected with the upper slope surface, the upper slope surface being a surface bending upwards and extending from the rear end of the vehicle body towards a front end of the vehicle body, the lower slope surface being a surface bending downwards and extending from the upper slope surface towards the front end of the vehicle body, the display device being provided on the lower slope surface; wherein the housing is formed with an accommodation space, a steering mechanism for controlling steering of the vehicle body being accommodated in the accommodation space, the steering mechanism comprising a steering shaft and a sensor; and
   wherein the control rod is connected with the steering shaft at the rear end of the vehicle body, and extends from the rear end of the vehicle body to a position suitable for leg control of the operator, the control rod being formed with a bending portion matched with a shape of the upper slope surface, the control rod being rotated under control of the operator, thereby driving the steering shaft in rotation, so as to control steering of the vehicle body.

9. A two-wheeled dynamic balance vehicle, comprising:
   two wheels;
   a vehicle body, provided on the two wheels, a pedal being provided on the vehicle body;
   a middle cabin, provided directly above the pedal, the middle cabin comprising a housing, a display device being provided on the housing to enable an operator standing on the pedal to read man-machine interaction information, wherein the housing is formed with an upper slope surface, a flat surface and a lower slope surface, the upper slope surface being connected with the lower slope surface through the flat surface, the display device being provided on at least one of the flat surface or the lower slope surface;

a steering mechanism, accommodated in the housing and comprising a steering shaft and a sensor; and a control rod, the control rod being connected with the steering shaft at a rear end of the vehicle body and extending from the rear end of the vehicle body to a position suitable for leg-control of the operator, the control rod being formed with a bending portion matched with a shape of the upper slope surface, the control rod being rotated under control of the operator, thereby driving the steering shaft in rotation, so as to control steering of the vehicle body.

10. The two-wheeled dynamic balance vehicle according to claim 9, wherein the housing is formed with a transparent region, the display device is located within the housing and corresponds to a position of the transparent region.

11. The two-wheeled dynamic balance vehicle according to claim 9, wherein a clamping element suitable for being clamped by legs of the operator is connected to the control rod.

12. The two-wheeled dynamic balance vehicle according to claim 11, wherein external of the clamping element is wrapped with a flexible part.

13. The two-wheeled dynamic balance vehicle according to claim 9, wherein the control rod is connected with the steering shaft through a connecting seat, the connecting seat comprises a connecting sleeve and a connecting rod, the connecting sleeve is connected with the steering shaft, the connecting rod is connected with the control rod.

14. The two-wheeled dynamic balance vehicle according to claim 9, wherein the display device is a Light Emitting Diode display screen or a Liquid Crystal display screen.

15. The two-wheeled dynamic balance vehicle according to claim 9, wherein a handle portion is provided on the housing.

16. A combined mechanism of a middle cabin and a control rod, mounted on a vehicle body of a two-wheeled dynamic balance vehicle and comprising the middle cabin and the control rod, wherein the middle cabin is provided directly above the vehicle body, the middle cabin being provided with a housing, a display device being provided on the housing to enable an operator standing on the vehicle body to read man-machine interaction information, wherein the housing is formed with an upper slope surface, a flat surface and a lower slope surface, the upper slope surface being connected with the lower slope surface through the flat surface, the display device being provided on at least one of the flat surface or the lower slope surface; wherein the housing is formed with an accommodation space, a steering mechanism for controlling steering of the vehicle body being accommodated in the accommodation space, the steering mechanism comprising a steering shaft and a sensor; and wherein the control rod is connected with the steering shaft at a rear end of the vehicle body, and extends from the rear end of the vehicle body to a position suitable for leg control of the operator, the control rod being formed with a bending portion matched with a shape of the upper slope surface, the control rod being rotated under control of the operator, thereby driving the steering shaft in rotation, so as to control steering of the vehicle body.

* * * * *